(12) United States Patent
Azegami et al.

(10) Patent No.: US 11,387,943 B2
(45) Date of Patent: Jul. 12, 2022

(54) COMMUNICATION SYSTEM FOR PACKET DATA COMMUNICATION, CONTROL SYSTEM FOR PACKET DATA COMMUNICATION AND COMMUNICATION DEVICE FOR PACKET DATA COMMUNICATION

(71) Applicant: KOWA COMPANY, LTD., Nagoya (JP)

(72) Inventors: Tomohisa Azegami, Saitama (JP); Kenichi Namiki, Saitama (JP)

(73) Assignee: KOWA COMPANY, LTD., Nagoya (JP)

( * ) Notice: Subject to any disclaimer, the term of this patent is extended or adjusted under 35 U.S.C. 154(b) by 30 days.

(21) Appl. No.: 17/056,480

(22) PCT Filed: May 22, 2019

(86) PCT No.: PCT/JP2019/020193
§ 371 (c)(1),
(2) Date: Nov. 18, 2020

(87) PCT Pub. No.: WO2019/225626
PCT Pub. Date: Nov. 28, 2019

(65) Prior Publication Data
US 2021/0119736 A1    Apr. 22, 2021

(30) Foreign Application Priority Data

May 23, 2018   (JP) .............................. JP2018-098521

(51) Int. Cl.
*H04L 1/08*   (2006.01)
*H04L 1/16*   (2006.01)
*H04L 1/18*   (2006.01)

(52) U.S. Cl.
CPC .............. *H04L 1/08* (2013.01); *H04L 1/1607* (2013.01); *H04L 1/18* (2013.01); *H04L 1/189* (2013.01);
(Continued)

(58) Field of Classification Search
CPC . H04L 1/08; H04L 1/1607; H04L 1/18; H04L 1/1816; H04L 1/189; H04L 1/1896; H04L 67/12; H04L 1/188
See application file for complete search history.

(56) References Cited

U.S. PATENT DOCUMENTS 6,081,568 A * 6/2000 Oda ........................ H04L 1/189
                                                                    375/358
9,706,581 B2 * 7/2017 Deu-Ngoc .......... H04W 74/085
(Continued)

FOREIGN PATENT DOCUMENTS

CN   107078855 A    8/2017
JP   62-239735 A    10/1987
(Continued)

OTHER PUBLICATIONS

"IEEE Standard for Ethernet Amendment 6: Physical Layer Specifications and Management Parameters for Ethernet Passive Optical Networks Protocol over Coax," in IEEE Std 802.3bn-2016 , vol., No., pp. 1-341, Dec. 7, 2016 (Year: 2016).*
(Continued)

*Primary Examiner* — Cynthia Britt
(74) *Attorney, Agent, or Firm* — WHDA, LLP

(57) ABSTRACT

A first communication unit 11 repeatedly transmits the same data signal as a transmitted data signal to a second communication unit 23 at shorter time intervals than an acknowledgement time in which an ACK signal is returned from the second communication unit 23 without any failure. As a result, even when the transmitted data signal is garbled in the
(Continued)

middle of a transmission path due to noise, the second communication unit 23 can rapidly receive the repeatedly transmitted same data signal.

20 Claims, 13 Drawing Sheets

(52) U.S. Cl.
CPC .......... *H04L 1/1816* (2013.01); *H04L 1/1896* (2013.01)

(56) References Cited

U.S. PATENT DOCUMENTS

| | | | |
|---|---|---|---|
| 10,009,445 B2* | 6/2018 | Fall | H04L 1/1838 |
| 2001/0046065 A1 | 11/2001 | Furukawa et al. | |
| 2008/0109565 A1 | 5/2008 | Ajanovic et al. | |
| 2010/0177701 A1* | 7/2010 | Maheshwari | H04L 1/1685 370/328 |
| 2015/0092529 A1 | 4/2015 | Vasseur et al. | |
| 2017/0338909 A1 | 11/2017 | Azegami et al. | |

FOREIGN PATENT DOCUMENTS

| | | |
|---|---|---|
| JP | 5-160815 A | 6/1993 |
| JP | 10-285211 A | 10/1998 |
| JP | 2001-282488 A | 10/2001 |
| JP | 2011-114448 A | 6/2011 |
| JP | 2013-128207 A | 6/2013 |

OTHER PUBLICATIONS

"IEEE Standard for Air Interface for Broadband Wireless Access Systems," in IEEE Std 802.16-2012 (Revision of IEEE Std 802.16-2009), vol., No., pp. 1-2542, Aug. 17, 2012 (Year: 2012).*
International Search Report dated Jul. 16, 2019, issued in counterpart application No. PCT/JP2019/020193 (2 pages).
"The world's leading interface standard for high-speed imaging", Home page of "CoaXPress", Searched on Apr. 9, 2018,<http://WWW.coaxpress.com/>, cited in the Specification (3 pages).
Partial Supplementary European Search Report dated Feb. 9, 2022, issued in counterpart EP Application No. 19808437.8. (16 pages).
QUALCOMM: "On reliable transmission of URLLC data", [Online] Oct. 8, 2017 (Oct. 8, 2017), 3GPP Draft; R2-1711710 on Reliable Transmission of URLLC Data, 3rd Generation Partnership Project (3GPP), Mobile Competence Centre; 650, Route Des Lucioles ; F-06921 Sophia-Antipolis Cedex ; France, XP051343668; Cited in Partial Supplementary European Search Report dated Feb. 9, 2022. (5 pages).
Extended (Supplementary) European Search Report dated May 24, 2022, issued in counterpart EP Application No. 19808437.8. (15 pages).
Office Action dated May 13, 2022, issued in counterpart TW Application No. 108117708, with English Translation. (11 pages).

* cited by examiner

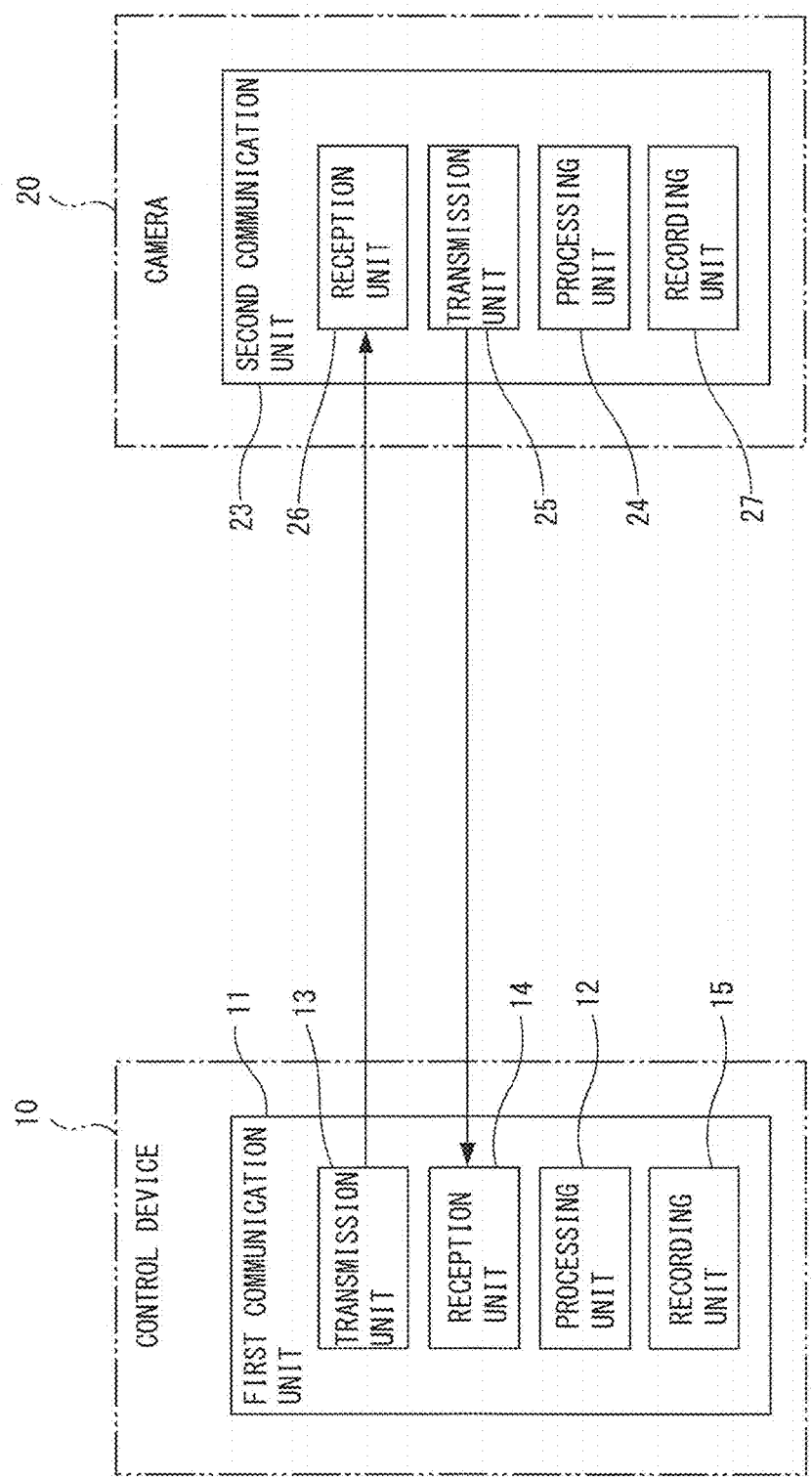

COMMUNICATION SYSTEM FOR PACKET DATA COMMUNICATION, CONTROL SYSTEM FOR PACKET DATA COMMUNICATION AND COMMUNICATION DEVICE FOR PACKET DATA COMMUNICATION

TECHNICAL FIELD

The present invention relates to, for example, a communication system suitable for packet data communication between an industrial digital camera (hereinafter, also simply referred to as a "camera") and a control device.

BACKGROUND ART

For example, many cameras are installed on an industrial robot operating in a factory, and are used for inspection of products and the like. These cameras normally receive commands from an external control device via a communication system, and operate according to the commands. However, in a factory environment where many robots operate, many electrical noises occur frequently, and these noises interfere with the data communication between the control device and the cameras, which has caused a risk of failure that the cameras cannot be properly controlled or the like.

In recent years, a standard called "CoaXPress (registered trademark)" has attracted attention as a data communication standard for industrial digital cameras (see Non-Patent Document 1).

The "CoaXPress" standard enables data transfer of up to 6.25 Gbps, camera control signals of up to 20.8 Mbps, and power supply of 13 W with a single coaxial cable, and the transmissible distance of data is 100 m or more at 1.25 Gbps.

Since this standard uses a coaxial cable, it has a feature in which noise immunity thereof is higher than that of a twisted pair cable.

However, even if the "CoaXPress" standard having high noise immunity is adopted, it would be impossible to completely eliminate communication interference caused by noise. Therefore, conventional communication systems have adopted a configuration in which after transmitting a data signal to a camera, a control device waits for an ACK signal from the camera for a predetermined certain standby time, and if no ACK signal is returned within the standby time, the control device re-transmits the same data signal.

In this way, in the conventional configuration in which the data signal is re-transmitted after a certain standby time has elapsed, it has been impossible to ignore deterioration of communication performance caused by a transmission delay under an environment where data signals are frequently garbled in the middle of a transmission path due to noise, so that there has been a risk that inconveniences such as the inability to control devices such as cameras smoothly and appropriately may occur.

CITATION LIST

Non-Patent Literature

Non-Patent Literature 1: Homepage of "CoaXPress", [Searched on Apr. 9, 2018], Internet <http://WWW. coaxpress. com/>

SUMMARY OF INVENTION

Technical Problem

The present invention has been made in view of the above circumstances, and has an object to suppress deterioration of communication performance caused by a transmission delay even under an environment where data signals are frequently garbled in the middle of a transmission path due to noise.

Solution to Problem

In order to attain the foregoing object, according to the present invention, in a communication system for performing packet data communication between a first communication unit and a second communication unit, the first communication unit is configured to transmit a data signal to the second communication unit with an identification code being included in the data signal, the second communication unit is configured to return an ACK signal including the same identification code as an identification code included in a received data signal to the first communication unit, the first communication unit repeatedly transmits the transmitted data signal to the second communication unit at a time interval shorter than a preset failure determination time, and the failure determination time is longer than a time in which the ACK signal is returned from the second communication unit without any failure.

In this way, the first communication unit repeatedly transmits the same data signal as the transmitted data signal to the second communication unit at a time interval shorter than the preset failure determination time from the second communication unit, so that even when the transmitted data signal is garbled due to noise in the middle of a transmission path, the second communication unit can rapidly receive the repeatedly transmitted same data signals.

Further, it is preferable that with respect to the data signals having the same identification code repeatedly transmitted from the first communication unit, the second communication unit processes only a first-received data signal as a processing target, and excludes subsequently repeatedly transmitted data signals having the same content from processing targets.

In other words, by paying attention to the identification code, the second communication unit determines that the data signal including the same identification code as the already-received data signal is a data signal having the same content, and excludes the data signal from a processing target.

Further, it is preferable that the first communication unit is configured to transmit a data signal including an identification code having a preset predetermined value to the second communication unit at an arbitrary timing such as when communication with the second communication unit is started or in a reset operation, and the second communication unit is configured so that with respect to a data signal including an identification code having the predetermined value, the second communication unit does not exclude the data signal from a processing target even when receiving the data signal repeatedly.

For example, when at the beginning of start (restart) of communication, the first communication unit creates a data signal including the same identification code as an identification code recorded in the second communication unit before the start (restart) of the communication and transmits the data signal to the second communication unit, there is a risk that the second communication unit may determine that the same data signal is received even though the data signal has a different content from that of the data signal received before the start (restart) of the communication, and exclude the data signal from a processing target.

Therefore, when the second communication unit receives a data signal including an identification code having a predetermined value, the second communication unit can avoid the above-mentioned inconvenience by processing the data signal always.

In addition, with respect to data signals including an identification code having a predetermined value, in view of peculiarity of the data content, even when the data signals including the identification code having the same predetermined value are sequentially sent, the second communication unit does not exclude the data signals from processing targets, so that the data signals can be reliably processed.

Here, when the first communication unit receives an ACK signal including the same identification code as an identification code included in a transmitted data signal from the second communication unit, the first communication unit may be configured to stop a repeated transmission operation of data signals including the identification code.

Furthermore, the first communication unit may be configured to repeatedly transmit a transmitted data signal to the second communication unit at a preset frequency.

It is preferable that after receiving an ACK signal, the first communication unit is configured to include a new identification code in a data signal to be next transmitted, and then transmit the data signal to the second communication unit.

By including a sequentially updated identification code in a data signal to be newly transmitted as described above, the second communication unit can definitely determine the identity of the data signal by paying attention to the identification code.

When a preset failure determination time has elapsed without receiving any ACK signal including the same identification code as an identification code included in a transmitted data signal from the second communication unit, the first communication unit is configured to stop the repeated transmission operation of the transmitted data signal.

When the first communication unit cannot receive any ACK signal from the second communication unit because a communication failure other than noise continues for a long time, it is useless to continue repeated transmission of a data signal, which may cause a risk of deterioration communication performance.

Therefore, needless communication processing can be omitted by presetting a failure determination time and stopping the repeated transmission operation of the data signal when the failure determination time has elapsed.

Next, in a communication system for performing packet data communication between a first communication unit and a plurality of second communication units via an intermediate communication unit, the first communication unit includes an identification code in a data signal and then transmits the data signal to the intermediate communication unit, the intermediate communication unit distributes and transfers the received data signal to the second communication unit or another intermediate communication unit, the intermediate communication unit and the second communication unit are configured to return an ACK signal including the same identification code as the identification code included in the received data signal to a transmission source of the data signal, the first communication unit repeatedly transmits the transmitted data signal at a time interval shorter than a preset failure determination time, the intermediate communication unit likewise repeatedly transfers the transferred data signal at a time interval shorter than the preset failure determination time, and the failure determination time is longer than a time in which the ACK signal is returned without any failure from each of the intermediate communication unit and the second communication unit.

In this way, the first communication unit and the intermediate communication unit repeatedly transmit or transfer the same data signal as a transmitted or transferred data signal at a time interval shorter than the preset failure determination time, whereby the second communication unit or another intermediate communication unit can rapidly receive the repeatedly transmitted or transferred same data signal even when the transmitted or transferred data signal is garbled due to noise in the middle of the transmission path.

Further, it is preferable that with respect to data signals including the same identification code repeatedly transmitted from the first communication unit, the intermediate communication unit is configured to process only a first-received data signal as a processing target, and with respect to data signals including the same identification code repeatedly transferred from the intermediate communication unit, the second communication unit is configured to process only a first-received data signal as a processing target.

In other words, by paying attention to the identification code, the intermediate communication unit and the second communication unit determine that the data signal including the same identification code as the already-received data signal is a data signal having the same content, and exclude the data signal from a processing target.

Further, it is preferable that the first communication unit is configured to transmit a data signal including an identification code having a preset predetermined value at an arbitrary timing such as a time when communication is started or a reset operation time, and with respect to data signals including the identification code having the predetermined value, the intermediate communication unit and the second communication unit are configured not to exclude the data signals from processing targets even when receiving the data signals repeatedly.

For example, when at the beginning of start (restart) of communication, the first communication unit creates a data signal including the same identification code as an identification code recorded in the second communication unit or the intermediate communication unit before the start (restart) of communication and transmits the data signal to the second communication unit or another intermediate communication unit, there is a risk that the second communication unit or the other intermediate communication unit may determine that the data signal is the same as a data signal received before the start of communication even though the data signal has a different content from that of the data signal received before the start of communication, so that the data signal is excluded from a processing target.

Therefore, when receiving a data signal including an identification code having a predetermined value, the second communication unit or the intermediate communication unit processes the data signal, whereby the identification code of the data signal received previously is updated to the identification code having the predetermined value. Therefore, the above-mentioned inconvenience can be avoided.

In addition, with respect to data signals each including the identification code having the predetermined value, in consideration of peculiarity of the data content thereof, even when data signals including the same identification code are sequentially sent, these data signals are not excluded from processing targets, so that the data signals can be reliably processed.

Here, when receiving an ACK signal including the same identification code as the identification code included in the transmitted data signal, the first communication unit may be configured to stop a repeated transmission operation of data signals including the identification code. Likewise, when receiving an ACK signal including the same identification code as the identification code included in the transferred data signal, the intermediate communication unit may be configured to stop a repeated transfer operation of data signals including the identification code.

Further, the first communication unit may be configured to repeatedly transmit the transmitted data signal at a preset frequency. Likewise, the intermediate communication unit may be configured to repeatedly transfer the transferred data signal at a preset frequency.

Further, the first communication unit is preferably configured to include a new identification code in a data signal to be next transmitted and transmit the data signal to the intermediate communication unit after receiving the ACK signal.

By including a sequentially updated identification code in a data signal to be newly transmitted as described above, the intermediate communication unit can definitely determine the identity of the data signal by paying attention to the identification code.

When a preset failure determination time has elapsed without receiving any ACK signal including the same identification code as the identification code included in the transmitted data signal, the first communication unit may be configured to stop a repeated transmission operation of the transmitted signal.

Likewise, when a preset failure determination time has elapsed without receiving any ACK signal including the same identification code as the identification code included in the transferred data signal, the intermediate communication unit may be configured to stop a repeated transfer operation of the transferred data signal.

When a communication failure other than noise continues for a long time and the first communication unit cannot receive any ACK signal from the second communication unit or the intermediate communication unit, it is useless to repeatedly continue transmission or transfer of data signals, which may cause a risk of deteriorating communication performance.

Therefore, a failure determination time is set in advance and an operation of repeatedly transmit or transfer of data signals is stopped when the failure determination time has elapsed, whereby useless communication processing can be eliminated.

As described above, the intermediate communication unit distributes and transfers the received data signal to the second communication unit or another intermediate communication unit. This distributive transfer operation may cause data signals including the same identification code, but having different contents to be sequentially transferred to the second communication unit or another intermediate communication unit as a transfer destination (specific examples will be described later in the embodiments of the invention with reference to FIG. 11).

When data signals including the same identification code, but having different contents are sequentially transferred to the second communication unit or another intermediate communication unit as the transfer destination, the second communication unit or the other intermediate communication unit determines that a subsequently received data signal is the same as a previously received data signal and thus excludes the subsequently received data signal from a processing target although the subsequently received data signal should be processed.

In order to avoid such an event, the intermediate communication unit is preferably configured to change the identification code of a data signal and transfer the data signal individually for each transfer destination of the data signal so that data signals including the same identification code, but having different contents are not sequentially transferred to the transfer destination.

Further, the intermediate communication unit is preferably configured to restore the identification code included in an ACK signal returned for a data signal transferred with the identification code of the data signal being changed, to an original identification code before the identification code has been changed, and then return the ACK signal to a transmission source of the data signal.

This makes it possible to avoid the inconvenience caused by the intermediate communication unit sequentially distributing and transferring data signals including the same identification code, but having different contents to the same transfer destination.

As described above, according to the present invention, in the communication system that performs packet data communication between the first communication unit and the second communication unit, the first communication unit repeatedly transmits the same data signal as the transmitted data signal at a time interval shorter than the preset failure determination time, whereby the second communication unit can rapidly receive the repeatedly transmitted same data signals even when the transmitted data signal is garbled due to noise in the middle of a transmission path. Therefore, high communication performance can be maintained without delaying the processing in the second communication unit.

Further, according to the present invention, even in the communication system in which packet data communication is performed between the first communication unit and the plurality of second communication units via the intermediate communication unit, the first communication unit and the intermediate communication unit repeatedly transmit or transfer the same data signal as the transmitted or transferred data signal at a time interval shorter than the preset failure determination time, whereby the second communication unit or another intermediate unit can rapidly receive the repeatedly transmitted or transferred data signals even when the transmitted or transferred data signal is garbled due to noise in the middle of the transmission path. Therefore, high communication performance can be maintained without delaying the processing in the second communication unit and the intermediate communication unit.

BRIEF DESCRIPTION OF DRAWINGS

FIG. 1 is a block diagram schematically showing an outline of a communication system according to a first embodiment of the present invention.

REFERENCE SIGNS LIST

Figure 2A:
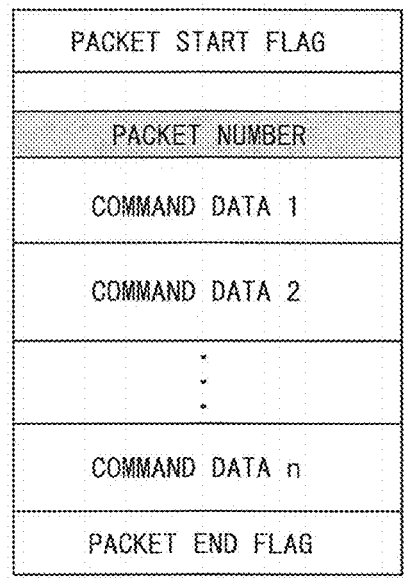
FIG. 2A is a diagram schematically showing a configuration example of a command signal to be transmitted from a first communication unit.

10: control device, 11: first communication unit, 12: processing unit, 13: transmission unit, 14: reception unit, 15: recording unit, 20: camera, 21: first camera, 22: second camera, 23: second communication unit, 24: processing unit, 25: transmission unit, 26: reception unit, 27: recording unit, 30: intermediate communication unit, 31: control-side reception unit, 32: control-side transmission unit, 33: first-camera-side transmission unit, 34: first-camera-side reception unit, 35: second-camera-side transmission unit, 36: second-camera-side reception unit, 37: processing unit, 38: recording unit

DESCRIPTION OF EMBODIMENTS

Embodiments of the present invention will be described hereunder in detail with reference to the drawings.

The following embodiments show a configuration example in which the present invention is applied to communication of a command signal for automatically controlling a camera 20 installed on an industrial robot by a control device 10. However, it is needless to say that the application of the present invention is not limited to the control of the camera 20.

First Embodiment

First, a first embodiment of the present invention will be described in detail with reference to FIGS. 1 to 6.

A communication system according to the present embodiment is an example of a camera control system, and has a function of performing packet data communication between a first communication unit 11 incorporated in a control device 10 and a second communication unit 23 incorporated in a camera 20 which is a control target. Note that the control device 10 and the camera 20 are examples of communication devices, respectively.

As shown in FIG. 1, the first communication unit includes components of a processing unit 12, a transmission unit 13, a reception unit 14, and a recording unit 15. The processing unit 12 creates a command signal for controlling the camera 20 based on an operator's instruction operation. The transmission unit 13 transmits the command signal created in the processing unit 12 to the second communication unit 23. Further, the recording unit 15 records a packet number included in the command signal transmitted to the second communication unit 23 in association with the command signal. The reception unit 14 receives an acknowledgement signal (ACK signal) returned from the second communication unit 23. Then, the processing unit 12 collates a packet number included in the received ACK signal with the packet number (recorded in the recording unit 15) included in the previously transmitted command signal to determine whether the previously transmitted command signal has been properly transmitted to the second communication unit 23.

On the other hand, the second communication unit also includes components of a processing unit 24, a transmission unit 25, a reception unit 26, and a recording unit 27. The reception unit 26 receives a command signal transmitted from the first communication unit 11. The processing unit 24 processes the command signal and recognizes a packet number included in the command signal. The recording unit 27 records the recognized packet number therein. The processing unit 24 creates an ACK signal for notifying the first communication unit 11 of the reception of the command signal. The transmission unit 25 transmits the ACK signal created by the processing unit 24 to the first communication unit 11 which is the transmission source of the command signal. Further, when the processing unit 24 confirms sequential reception of a command signal including the same packet number as an already-received command signal based on packet numbers recorded in the recording unit 27, the processing unit 24 has a function of excluding the command signal from processing targets.

Figure 2B:
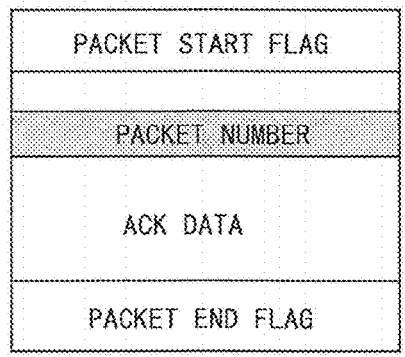
FIG. 2B is a diagram schematically showing a configuration example of an ACK signal to be returned from a second communication unit.

FIG. 2A is a diagram schematically showing a configuration example of a command signal transmitted from the first communication unit 11, and FIG. 2B is a diagram schematically showing a configuration example of an ACK signal returned from the second communication unit 23.

The command signal and the ACK signal are created, for example, by customizing based on the CoaXPress standard described above. Note that it is needless to say that they may be created according to other standards than described above.

As shown in FIG. 2A, the command signal is configured to include various command data indicating control contents of the camera 20 and also a packet number as an identification code for identifying each command signal. For the packet number, for example, when the command signal is composed of a packet having a data capacity of 128 bytes and 1 byte (8 bits) of the packet is used as the packet number, the packet number can be indicated as a number from 0 to 255.

The present embodiment is configured so that a packet number is assigned to command signals sequentially created by the processing unit 12 of the first communication unit 11 while the number is incremented from "1" to "255". After the packet number has reached "255", the packet number is returned to the first number "1" and the packet number is assigned again by using the numbers from "1" to "255".

Further, the processing unit 12 of the first communication unit 11 creates a command signal including an identification code having a preset predetermined value (hereinafter referred to as a special identification code), and transmits the command signal from the transmission unit 13 to the second communication unit.

For example, in the present embodiment, the packet number "0" is used as the special identification code for the command signal for instructing the start of a communication operation (that is, the activation of the communication system). In other words, when the processing unit 12 of the first communication unit 11 starts communication with the second communication unit 23 (including resumption), the processing unit 12 creates a command signal including the packet number 0, and the transmission unit 13 transmits the command signal to the second communication unit 23.

When the processing unit 24 of the second communication unit 23 receives a command signal including a predefined special identification code such as a special identification code (packet number 0), the processing unit 24 executes the processing without excluding the command signal from a processing target even when it sequentially receives the signal. At this time, the second communication unit 23 that has received the command signal including the special identification code updates the packet number of a previously received command signal to the special identification code and records it into the recording unit 27.

Note that the command signal transmitted from the first communication unit 11 is a data signal in which command data is recorded (see FIG. 2A), and similarly, the ACK signal returned from the second communication unit 23 is also a data signal in which acknowledgement data is recorded (see FIG. 2B).

Further, as described above, in the present embodiment, the identification code for identifying the command signal is defined by the packet number using the numbers from "1" to "255", and further the special identification code indicating the start of the communication operation is defined by the packet number 0. However, these identification codes and the special identification code can be arbitrarily specified according to the circumstances of a user or the like. For example, the numbers from "1" to "255" can be randomly used as packet numbers, can be grouped and used for packet numbers, or a number other than "0" can be used as a special identification code for packet numbers. Alternatively, symbols other than numbers can be used as identification codes and a special identification code.

However, in the present invention, the first communication unit 11 cannot sequentially include an identification code (packet number) of the same number or symbol in different command signals.

Figure 3:
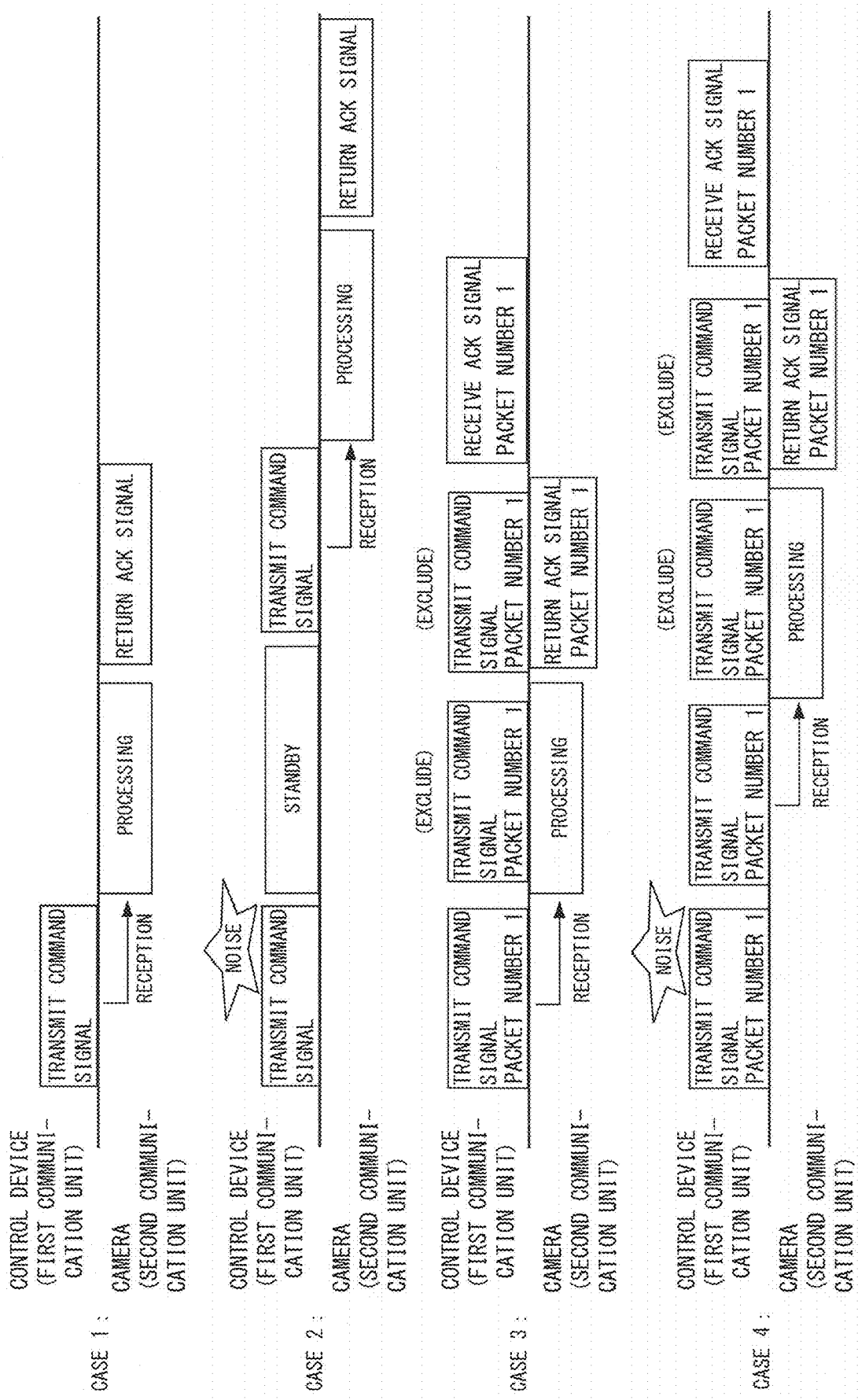
FIG. 3 is a communication timing diagram showing one of features of the communication system according to the first embodiment of the present invention.

FIG. 3 is a diagram showing a communication timing to describe one of features of the communication system according to the present embodiment.

Cases 1 and 2 show communication contents of a conventional communication system as a comparative example, and cases 3 and 4 show communication contents of the communication system according to the present embodiment.

As shown in the case 1, in the conventional communication system, when a command signal is transmitted once from the first communication unit 11 of the control device 10, the second communication unit 23 of the camera 20 receives the command signal, and performs communication processing, and thereafter an ACK signal is returned from the camera 20 (second communication unit 23).

As shown in the case 2, when the command signal transmitted from the first communication unit 11 of the control device 10 is not normally sent to the second communication unit 23 of the camera 20 due to an influence of noise, the first communication unit 11 of the control device 10 waits for a lapse of a certain standby time (failure determination time), and then re-transmits the same command signal on the condition that no ACK signal is returned from the second communication unit 23 of the camera 20 within the standby time. Therefore, there is a problem that the timing at which the command signal is received by the second communication unit 23 of the camera 20 is delayed due to the standby time.

On the other hand, as shown in the case 3, the communication system according to the present embodiment is configured such that the first communication unit 11 of the control device 10 repeatedly transmits the same command signal at short time intervals. Here, the time interval at which the same command signal is repeatedly transmitted is set to a time interval shorter than a preset failure determination time (the standby time in the case 2).

By repeatedly transmitting the same command signal at such short time intervals, as shown in the case 4, even when one of command signals is not sent to the second communication unit 23 of the camera 20 due to an influence of noise, another command signal is sent to the second communication unit 23 of the camera 20 without waiting for the lapse of the standby time, so that the second communication unit 23 can quickly receive the command signal.

The first communication unit 11 of the control device 10 includes a packet number in a command signal and then transmits the command signal. With respect to the packet numbers, the same command signals to be repeatedly transmitted are caused to include the same packet numbers. With respect to command signals including the same packet number which are repeatedly sent from the first communication unit 11, the second communication unit 23 of the camera 20 processes only a command signal which is first received, and excludes subsequently sequentially sent command signals including the same packet number from processing targets. As a result, rapid communication processing can be implemented without making the communication processing in the second communication unit 23 of the camera 20 cumbersome.

As shown in the cases 3 and 4, the second communication unit 23 of the camera 20 creates an ACK signal after receiving the command signal, and returns the ACK signal to the first communication unit 11 of the control device 10. The ACK signal created here is caused to include a packet number included in the command signal for which an acknowledgement is made. Based on the packet number included in the ACK signal, the first communication unit 11 of the control device 10 determines that a command signal including the same packet number has been properly sent to the second communication unit 23 of the camera 20, and stops the transmission of the command signal.

Note that a frequency at which the command signal is repeatedly transmitted may be preset in the first communication unit 11 of the control device 10. The first communication unit 11 of the control device 10 repeatedly transmits the same command signal at a preset frequency. Even when some of the repeatedly transmitted command signals are affected by noise and thus do not reach the second communication unit 23 of the camera 20, desired command processing is executed properly as long as one of the other command signals is transmitted to the second communication unit 23 of the camera 20.

Next, the communication operation by the communication system according to the present embodiment will be described with reference to FIGS. 4 to 6.

Figure 4:
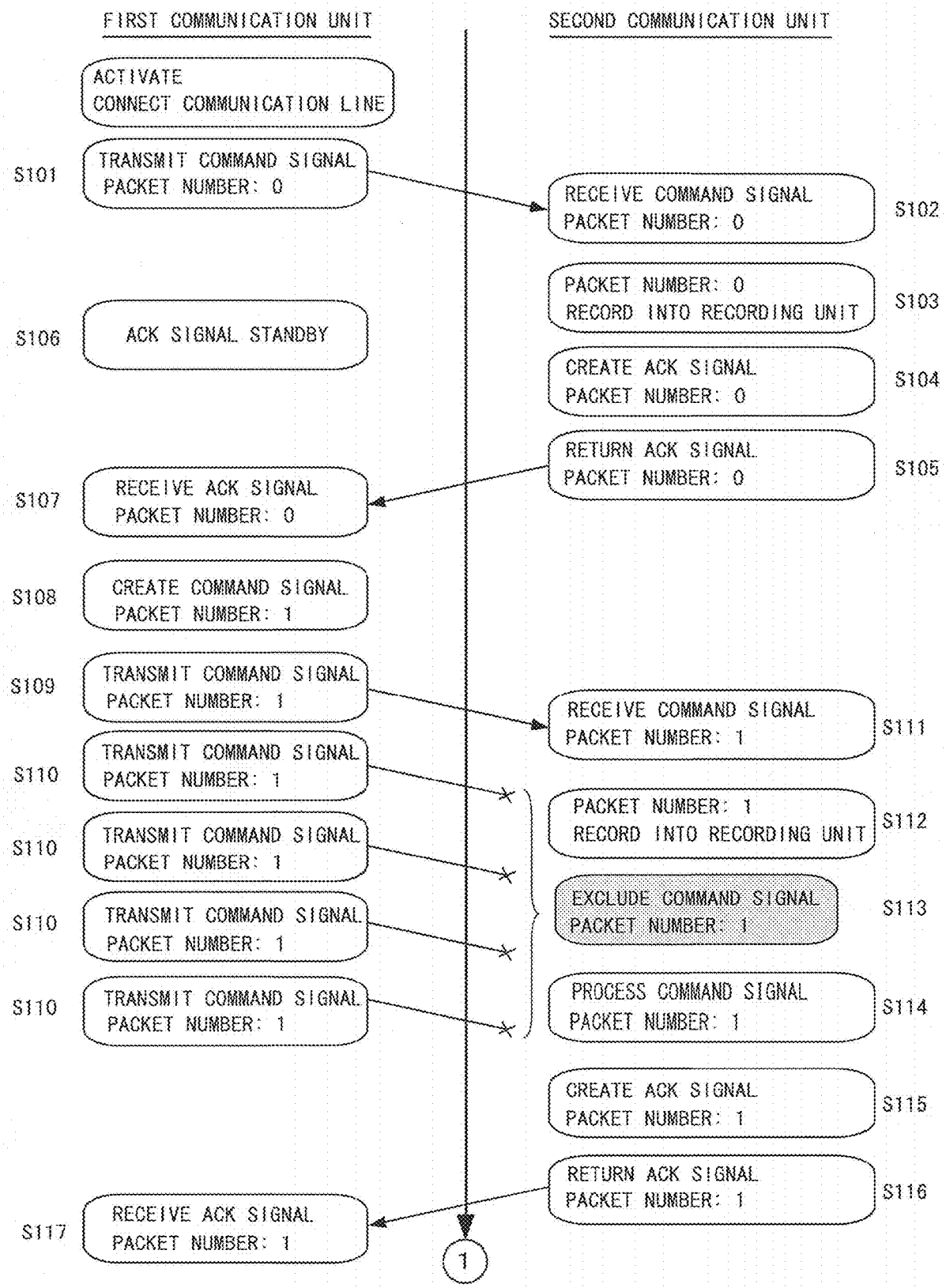
FIG. 4 is a sequence diagram showing a communication operation by the communication system according to the first embodiment of the present invention.

As shown in FIG. 4, when the communication system is first activated and a communication line is connected, a command signal including a special identification code (packet number 0) is transmitted from the first communication unit 11 of the control device 10 to the second communication unit 23 of the camera 20 (step S101). The second communication unit 23 receives the command signal including the special identification code (step S102), and updates the packet number of the received command signal recorded in the recording unit 27 to "0" (step S103). Further, the second communication unit 23 creates and returns an ACK signal for the command signal including the special identification code (steps S104 and S105).

After transmitting the command signal including the special identification code, the first communication unit 11 waits until the ACK signal is sent (step S106). After receiving the ACK signal including the packet number 0 corresponding to the special identification code (step S107), the first communication unit 11 executes creation of a command signal based on an operator's instruction operation (step S108). At this time, the command signal is caused to include a packet signal in which numbers from 1 to 255 are used in order. In FIG. 4, at this time point, a packet number 1 is included in the command signal.

The first communication unit 11 transmits this command signal including the packet number 1 to the second communication unit 23 (step S109). Further, the first communication unit 11 repeatedly transmits the same command signals including the packet number 1 at short intervals (step S110).

The second communication unit 23 receives the command signal including the packet number 1 sent from the first communication unit 11 (step S111), and records the packet number 1 in the recording unit 27 (step S112). Thereafter, the second communication unit 23 collates the packet numbers of the command signals repeatedly sent from the first communication unit 11 with the packet number 1 recorded in the recording unit 27, and excludes all command signals including the same packet number 1 from processing targets. (step S113).

The second communication unit 23 executes the processing on the first-received command signal including the packet number 1 (step S114), and subsequently creates an ACK signal for the command signal (step S115). At this time, the ACK signal is caused to include the same packet number 1 as the command signal for which an acknowledgement is made. Then, the ACK signal is returned to the first communication unit 11 (step S116).

After receiving the ACK signal (step S117), the first communication unit 11 confirms the packet number 1 included in the ACK signal, and stops the repeated transmission operation of the command signal including the same packet number 1.

Figure 5:
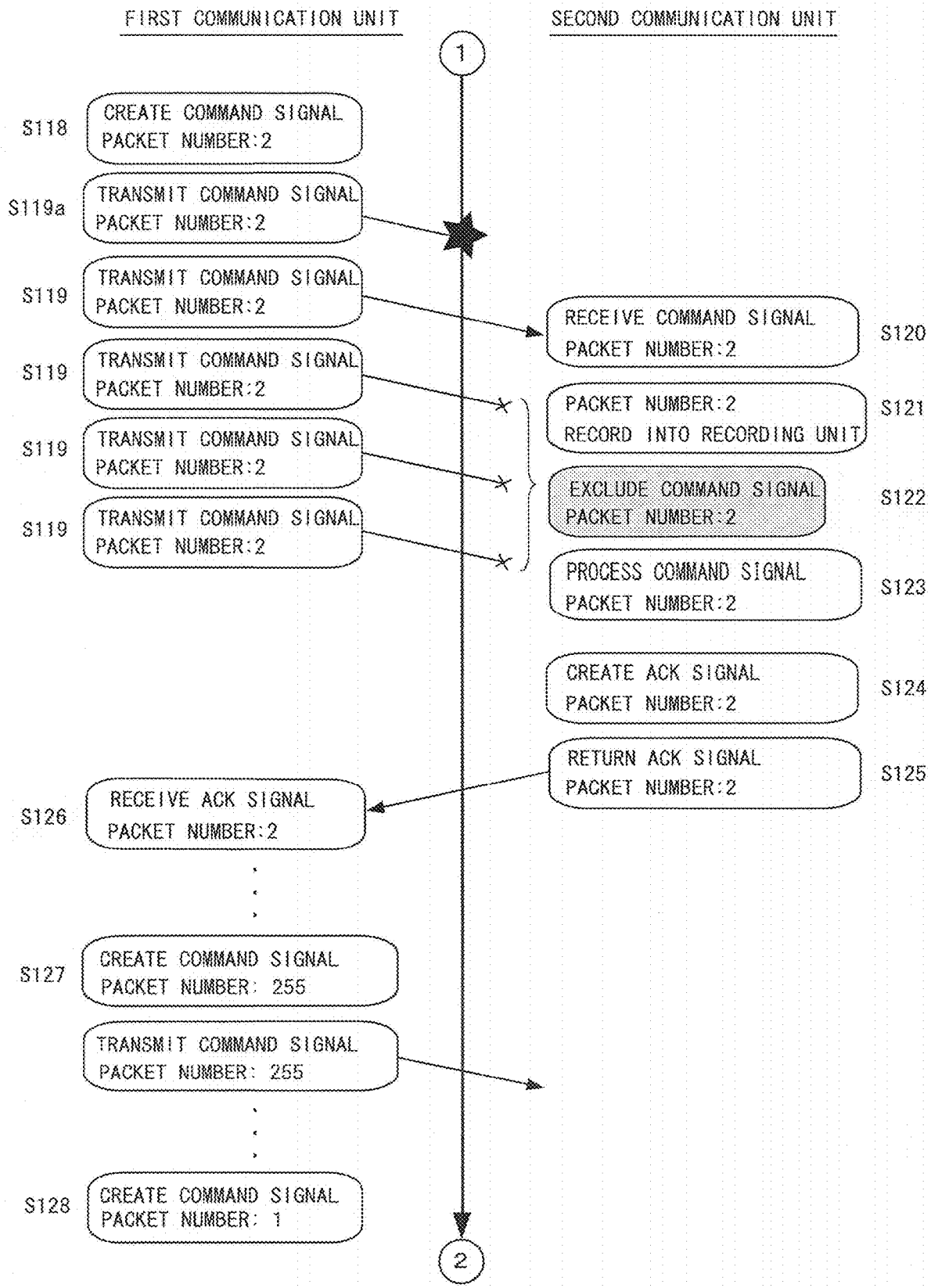
FIG. 5 is a sequence diagram showing a communication operation by the communication system according to the first embodiment of the present invention, which is subsequent to FIG. 4.

As shown in FIG. 5, the first communication unit 11 creates a command signal to be next transmitted (step S118), includes an incremented packet number 2 in the command signal, and then repeatedly transmits the command signal including the packet number 2 to the second communication unit 23 (step S119). Here, even when one of the repeatedly transmitted command signals does not properly reach the second communication unit 23 due to an influence of noise (step S119a), if the other command signals reach the second communication unit 23, the second communication unit 23 receives a command signal which is first received among the other command signals and (step S120), and records the packet number 2 of the command signal into the recording unit 27 (step S121). Thereafter, all the command signals repeatedly sent from the first communication unit 11 are excluded from the processing targets by the collation with the packet number 2 (step S122).

The second communication unit 23 executes the processing on the first-received command signal including the packet number 2 (step S123), and subsequently creates an ACK signal for the first-received command signal (step S124). Then, the second communication unit 23 returns the ACK signal to the first communication unit 11 (step S125).

After receiving the ACK signal (step S126), the first communication unit 11 stops the repeated transmission operation of the command signal by the collation with the packet number 2.

Through such a communication operation, a packet number is included in a new command signal while sequentially incrementing the packet number, and the command signal is transmitted from the first communication unit 11 to the second communication unit 23. The packet number to be included in the command signal is used up to 255 (step S127), returned to 1 again and then incremented sequentially (step S128).

Figure 6:
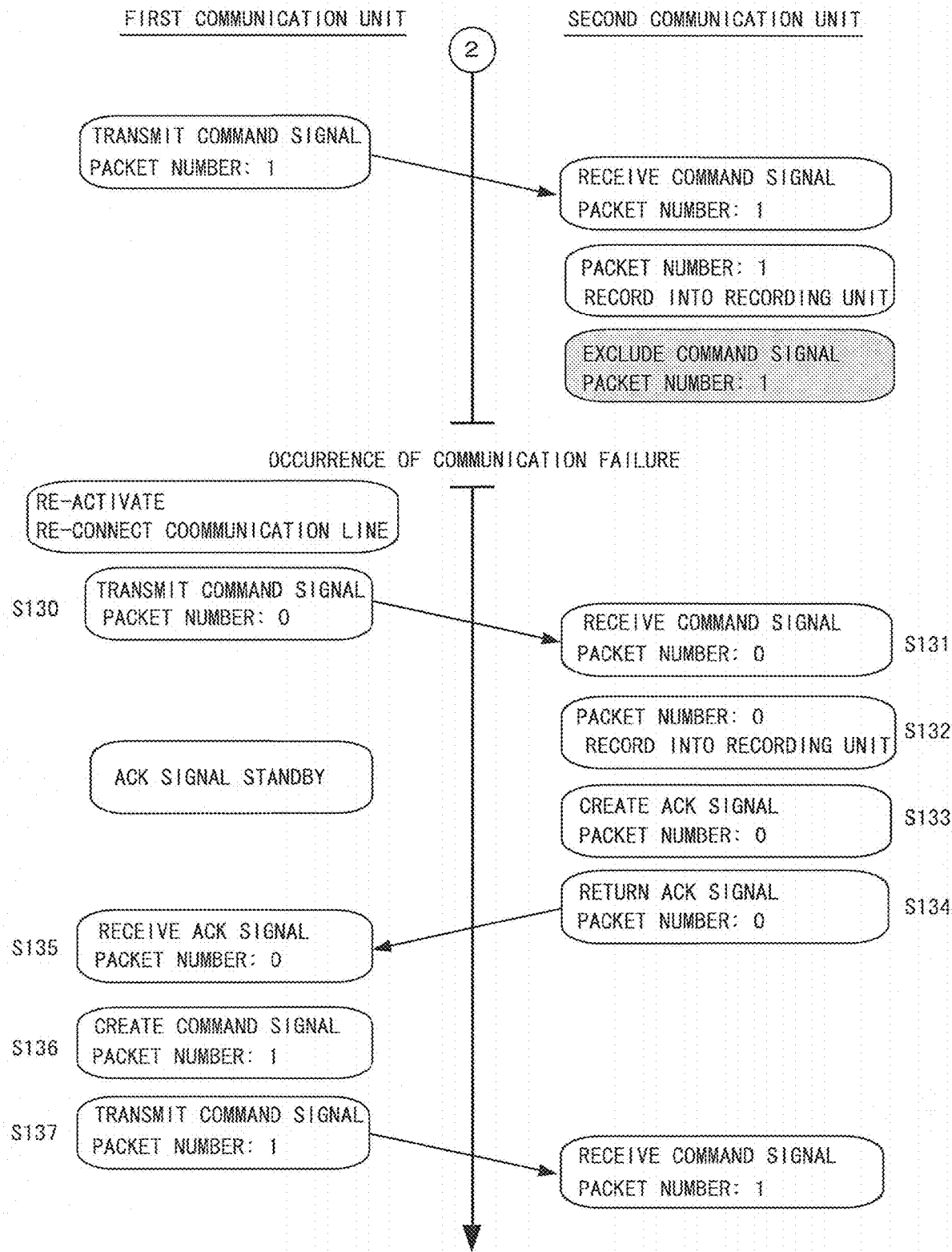
FIG. 6 is a sequence diagram showing a communication operation by the communication system according to the first embodiment of the present invention, which is subsequent to FIG. 5.
Figure 7:
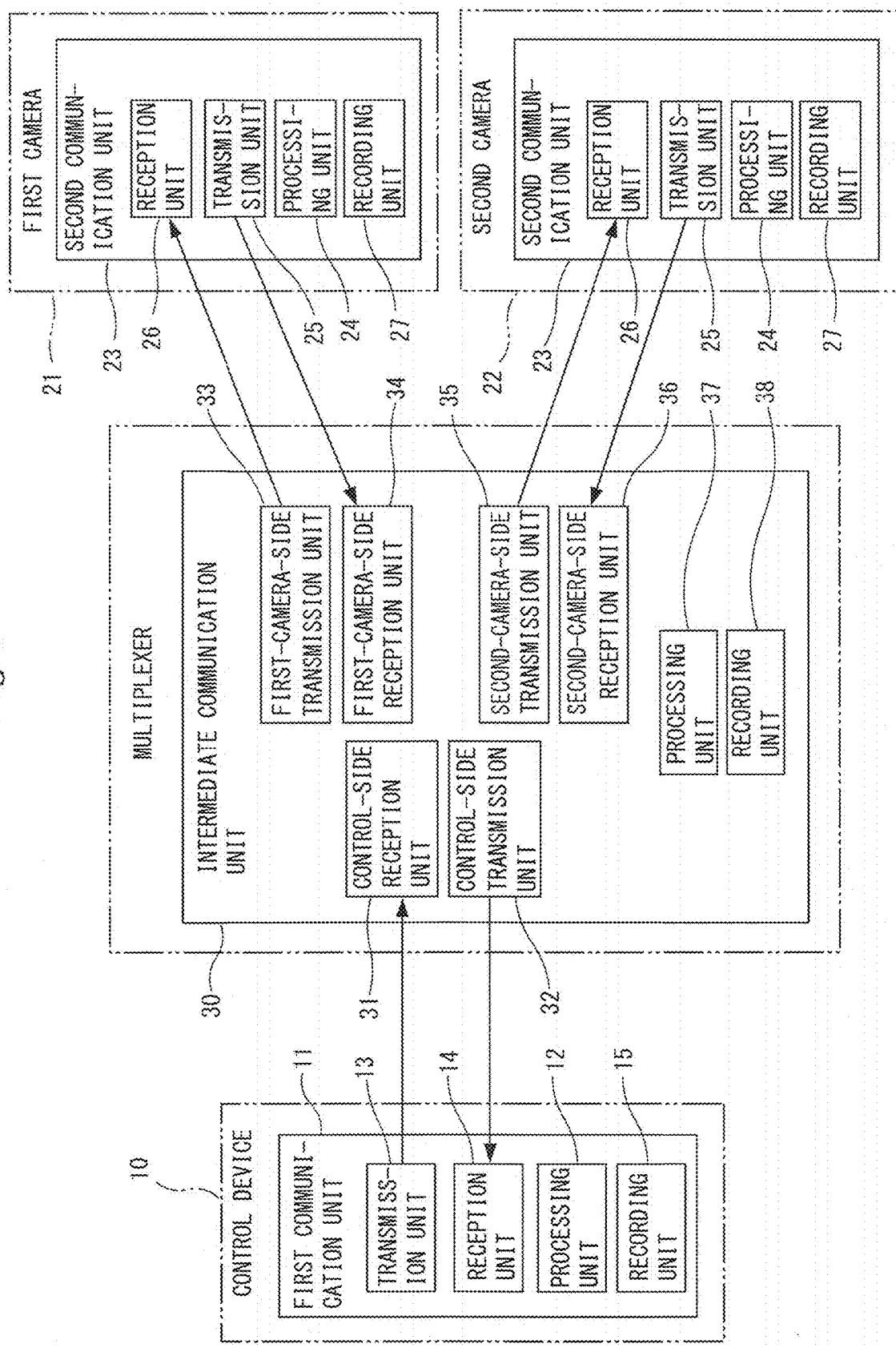
FIG. 7 is a block diagram schematically showing an outline of a communication system according to a second embodiment of the present invention.

As shown in FIG. 6, when a communication failure occurs in the communication system during execution of the communication operation of command signals, the data signal is repeatedly transmitted for a preset failure determination time, and when the failure determination time has elapsed, the repeated transmission of the transmitted data signal is stopped.

After the communication failure is resolved, the communication system is re-activated and the communication line is connected. At that time, the command signal including the special identification code (packet number 0) is transmitted again from the first communication unit 11 of the control device 10 to the second communication unit 23 of the camera 20 (step S130). The second communication unit 23 receives the command signal including the special identification code (step S131), and updates the packet number of the received command signal recorded in the recording unit 27 to "0" (step S132). Further, the second communication unit 23 creates and returns an ACK signal for the command signal including the special identification code (steps S133 and S134).

After receiving the ACK signal including the packet number 0 corresponding to the special identification code (step S135), the first communication unit 11 executes creation of a command signal based on an operator's instruction operation (step S136), and then transmits the command signal to the second communication unit 23 (step S137). In this way, a series of communication operations is executed again.

Second Embodiment

Next, a second embodiment of the present invention will be described in detail with reference to FIGS. 7 to 13.

A communication system according to the present embodiment has a function of performing packet data communication via an intermediate communication unit 30 between a first communication unit 11 incorporated in a control device 10 and a second communication unit 23 incorporated in each of a plurality of cameras 20 (a first camera 21, a second camera 22) as control targets.

Note that the same or corresponding components as or to those in the first embodiment described above are represented by the same reference numerals, and detailed description of the components will be partially omitted.

The first communication unit 11 and the second communication unit 23 have the same configuration and same function as those of the first embodiment.

The intermediate communication unit 30 is incorporated in a communication device called a multiplexer, and is configured to include various components of a control-side reception unit 31, a control-side transmission unit 32, a first-camera-side transmission unit 33, a first-camera-side reception unit 34, and a second-camera-side transmission unit 35, a second-camera-side reception unit 36, a processing unit 37, and a recording unit 38.

Out of these components, the control-side reception unit 31 receives a command signal transmitted from the transmission unit 13 of the control device 10. The control-side transmission unit 32 returns an ACK signal to the reception unit 14 of the control device 10 which is the source of the command signal. The first-camera-side transmission unit 33 transfers a command signal to the reception unit 26 of the first camera 21. The first-camera-side reception unit 34 receives an ACK signal returned from the transmission unit 25 of the first camera 21. Similarly, the second-camera-side transmission unit 35 transfers a command signal to the reception unit 26 of the second camera 22. The second-camera-side reception unit 36 receives the ACK signal returned from the transmission unit 25 of the second camera 22.

The processing unit 37 processes the received command signal, and recognizes a packet number included in the command signal. The recording unit 38 records the recognized packet number.

When the processing unit 37 receives command signals sent from the first communication unit 11 of the control device 10 for the second communication unit 23 of the first camera 21 or the second camera 22, the processing unit 37 has a function of distributing and transferring those command signals from the first-camera-side transmission unit 33 or the second-camera-side transmission unit 35 to the indicated second communication units 23.

In addition, when the processing unit 37 receives an ACK signal from the second communication unit 23 of the first camera 21 or the second camera 22, the processing unit 37 has a function of returning the ACK signal from the control-side transmission unit 32 to the reception unit 14 of the control device 10.

Further, when the processing unit 37 receives a command signal addressed to the intermediate communication unit 30, the processing unit 37 creates an ACK signal for the command signal. This ACK signal is returned from the control-side transmission unit 32 to the first communication unit 11 of the control device 10.

Further, when the processing unit 37 confirms sequential reception of a command signal including the same packet number as an already-received command signal based on packet numbers recorded in the recording unit 38, the processing unit 37 excludes the command signal from processing targets.

Further, when the processing unit 37 distributes and transfers command signals sent from the first communication unit 11 of the control device 10 to the second communication unit 23 of the first camera 21 or the second camera 22, the processing unit 37 has a function of changing the packet numbers of the command signals individually for each transfer destination so that data signals including the same packet number, but having different contents are not sequentially transferred to the transfer destination. Here, an original packet number before the change processing and a packet number after the change processing are recorded in association with each other in the recording unit 38.

In addition, the processing unit 37 has a function of restoring a packet number included in an ACK signal returned from the second communication unit 23 of the first camera 21 or the second camera 22 for a command signal transferred with the packet number thereof being changed, to an original packet number before the packet number has been changed, and returning the restored initial packet number to the first communication unit 11 of the control device 10. In this case, association information of the packet numbers before and after the change processing which has been recorded in the recording unit 38 is referred to.

Next, the communication operation by the communication system according to the present embodiment will be described with reference to FIGS. 8 to 12.

Figure 8:
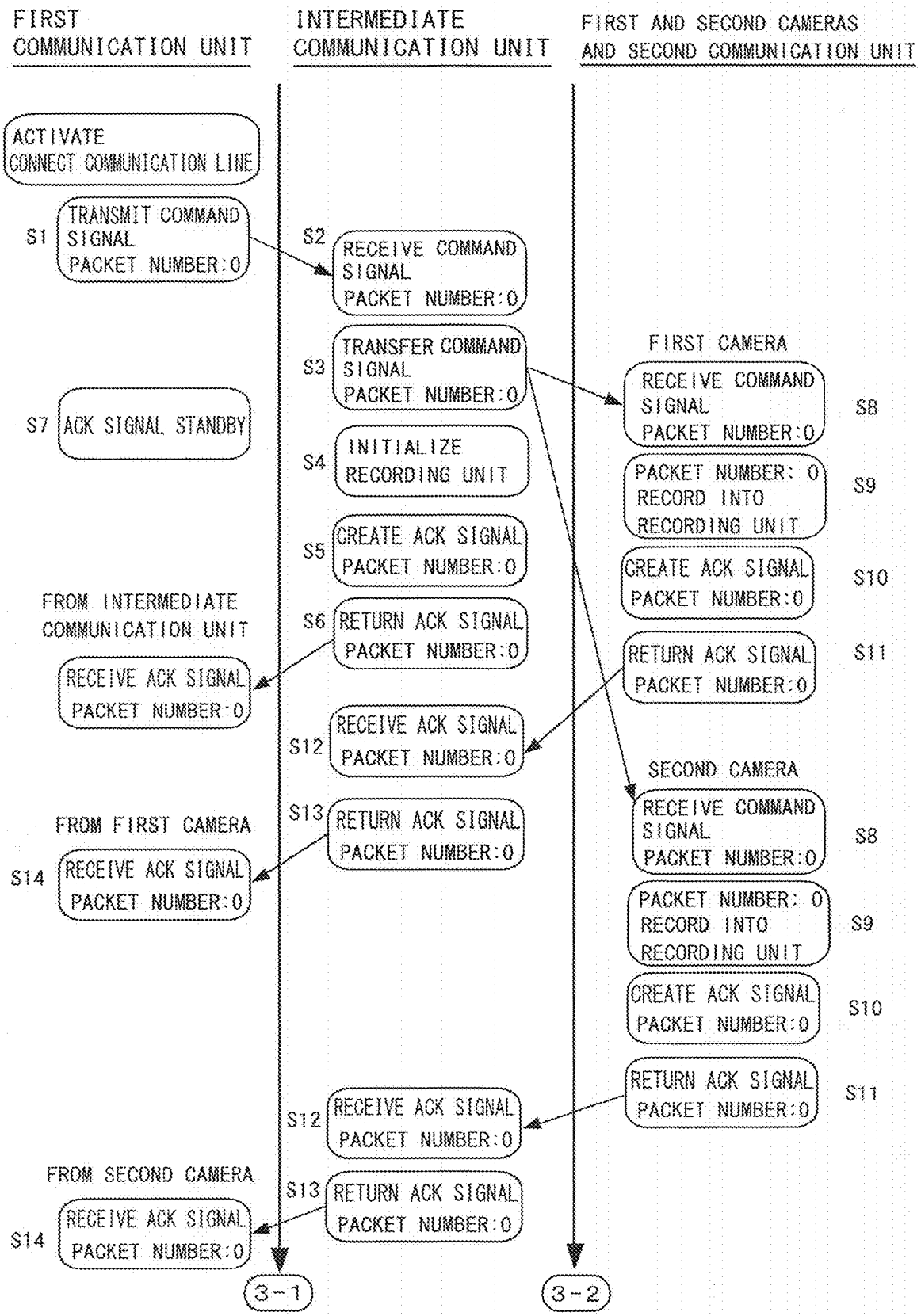
FIG. 8 is a sequence diagram showing a communication operation by the communication system according to the second embodiment of the present invention.

As shown in FIG. 8, when the communication system is first activated and a communication line is connected, a command signal including a special identification code (packet number 0) is transmitted from the first communication unit 11 of the control device 10. (step S1).

The intermediate communication unit 30 receives the command signal including the special identification code (step S2), and transfers the command signal including the special identification code to each of the second communication units 23 of the first camera 21 and the second camera 22 (step S3).

Further, the intermediate communication unit 30 processes the command signal including the received special identification code, and updates the packet number of the received command signal recorded in the recording unit 27 to "0" (step S4). Further, the intermediate communication unit 30 creates and returns an ACK signal for the command signal including the special identification code (steps S5 and S6).

After the first communication unit 11 of the control device 10 transmits the command signal including the special identification code, the first communication unit 11 of the control device 10 waits until an ACK signal is sent (step S7).

Each of the second communication units 23 of the first camera 21 and the second camera 22 receives the command signal including the special identification code transferred from the intermediate communication unit 30 (step S8), processes the command signal, and updates the packet number of the received command signal recorded in the recording unit 27 to "0" (step S9). Further, each of the second communication units 23 of the first camera 21 and the second camera 22 creates and returns an ACK signal for the command signal including the special identification code (steps S10 and S11).

The intermediate communication unit 30 receives the ACK signal returned from each of the second communication units 23 of the first camera 21 and the second camera 22 (step S12), and returns the ACK signal to the first communication unit 11 of the control device 10 (step S13). The first communication unit 11 of the control device 10 receives the ACK signal returned from each of the second communication units 23 of the first camera 21 and the second camera 22 via the intermediate communication unit 30 (step S14).

Figure 9:
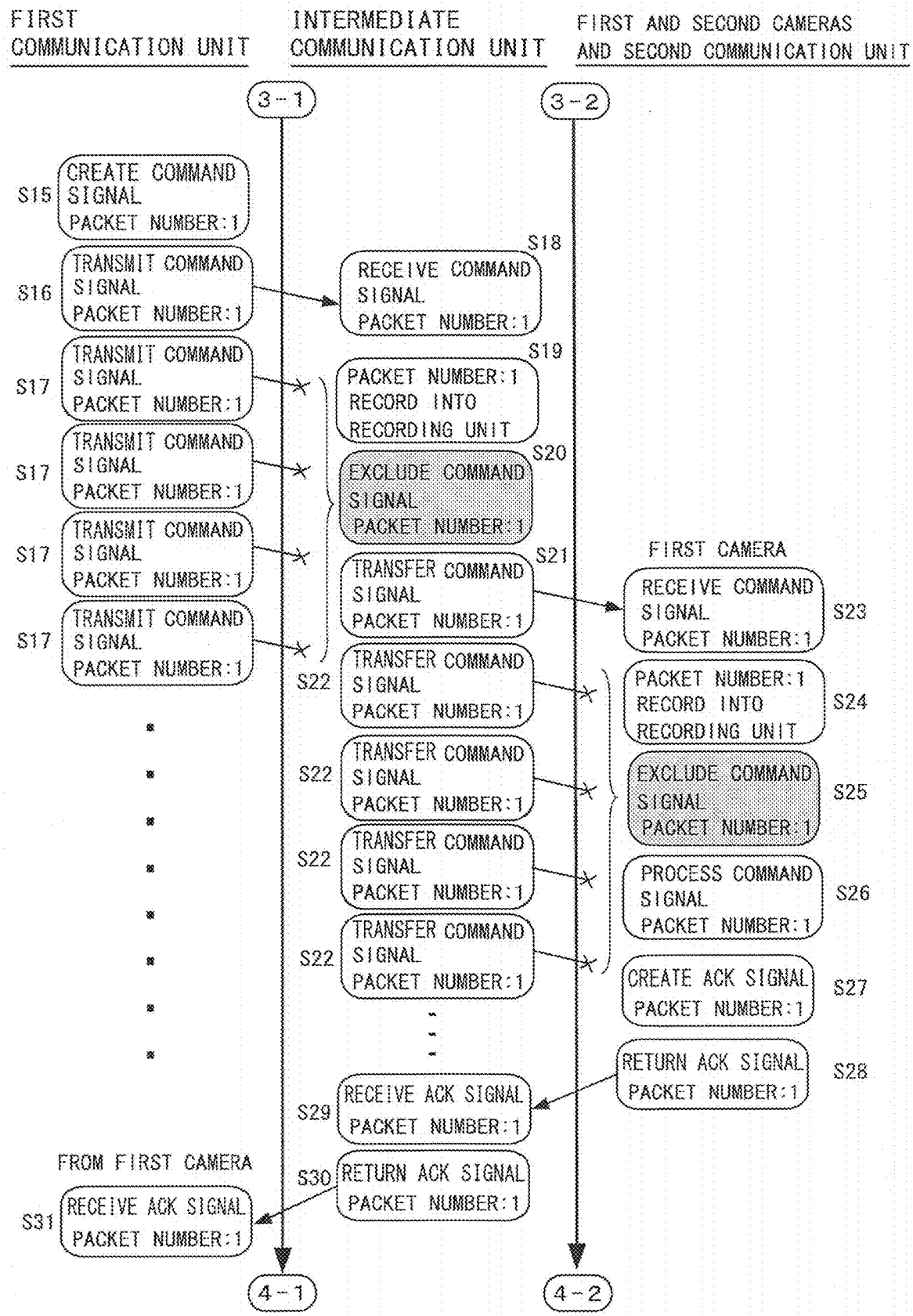
FIG. 9 is a sequence diagram showing a communication operation by the communication system according to the second embodiment of the present invention, which is subsequent to FIG. 8.

After receiving the ACK signal from each of the intermediate communication unit 30, and each of the second communication units 23 of the first camera 21 and the second camera 22 as described above, the first communication unit 11 of the control device 10 executes creation of a command signal based on an operator's instruction operation (step S15) as shown in FIG. 9. At this time, the command signal is caused to include a packet number which uses a number from 1 to 255 in order. In FIG. 9, at this point, the command signal including the packet number 1 for the first camera 21 is created.

The first communication unit 11 of the control device 10 transmits the command signal including the packet number 1 to the intermediate communication unit 30 (step S16). Further, the first communication unit 11 repeatedly transmits the same command signals including the packet number 1 at short intervals (step S17).

The intermediate communication unit 30 receives the command signal including the packet number 1 sent from the first communication unit 11 (step S18), and records the packet number 1 in the recording unit 38 (step S19). Thereafter, the intermediate communication unit 30 collates the packet numbers of command signals repeatedly sent from the first communication unit 11 with the packet number 1 recorded in the recording unit 38, and excludes all command signals including the same packet number 1 from processing (transfer processing) targets (step S20).

The intermediate communication unit 30 executes the transfer processing on the first-received command signal including the packet number 1, and transfers the command signal to the second communication unit 23 of the first camera 21 (step S21). Further, the intermediate communication unit 30 repeatedly transfers the same command signals including the packet number 1 to the second communication unit 23 of the first camera 21 at short intervals (step S22).

The second communication unit 23 of the first camera 21 receives the command signal including the packet number 1 sent from the intermediate communication unit 30 (step S23), and records the packet number 1 in the recording unit 27 (step S24). Thereafter, the second communication unit 23 collates the packet numbers of the command signals repeatedly transferred from the intermediate communication unit 30 with the packet number 1 recorded in the recording unit 27, and excludes all command signals including the same packet number 1 from the processing target (step S25).

The second communication unit 23 of the first camera 21 executes the processing on the first-received command signal including the packet number 1 (step S26), and subsequently creates an ACK signal for the command signal (step S27). At this time, the ACK signal is caused to include the same packet number 1 as the command signal for which an acknowledgement is made. Then, the ACK signal is returned to the intermediate communication unit 30 (step S28).

After receiving the ACK signal (step S29), the intermediate communication unit 30 confirms the packet number 1 included in the ACK signal, and stops the repeated transfer operation of command signals including the same packet number 1.

Further, the intermediate communication unit 30 returns the ACK signal received from the second communication unit 23 of the first camera 21 to the first communication unit 11 of the control device 10 (step S30). After receiving the ACK signal (step S31), the first communication unit 11 of the control device 10 stops the repeated transfer operation of the command signals by collation with the packet number 1.

Figure 10:
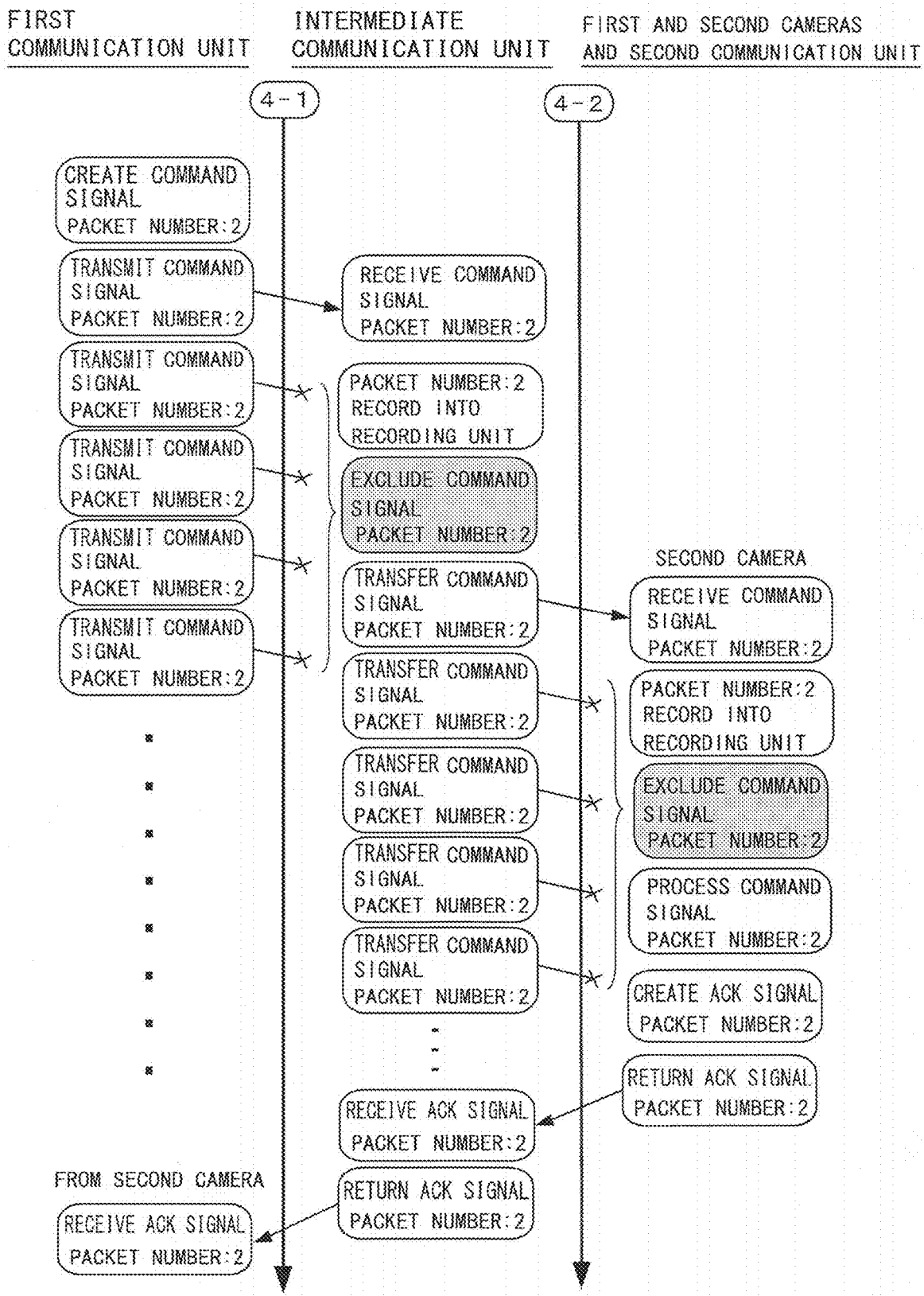
FIG. 10 is a sequence diagram showing a communication operation by the communication system according to the second embodiment of the present invention, which is subsequent to FIG. 9.

FIG. 10 shows a communication operation in which a command signal including packet number 2 is transmitted from the first communication unit 11 of the control device 10 to the second communication unit 23 of the second camera 22. As shown in FIG. 10, the command signal is also sent to the second communication unit 23 of the second camera 22 via the intermediate communication unit 30 in the same step as the communication operation shown in FIG. 9. An ACK signal is returned from the second communication unit 23 of the second camera 22 to the first communication unit 11 of the control device 10 via the intermediate communication unit 30.

Figure 11:
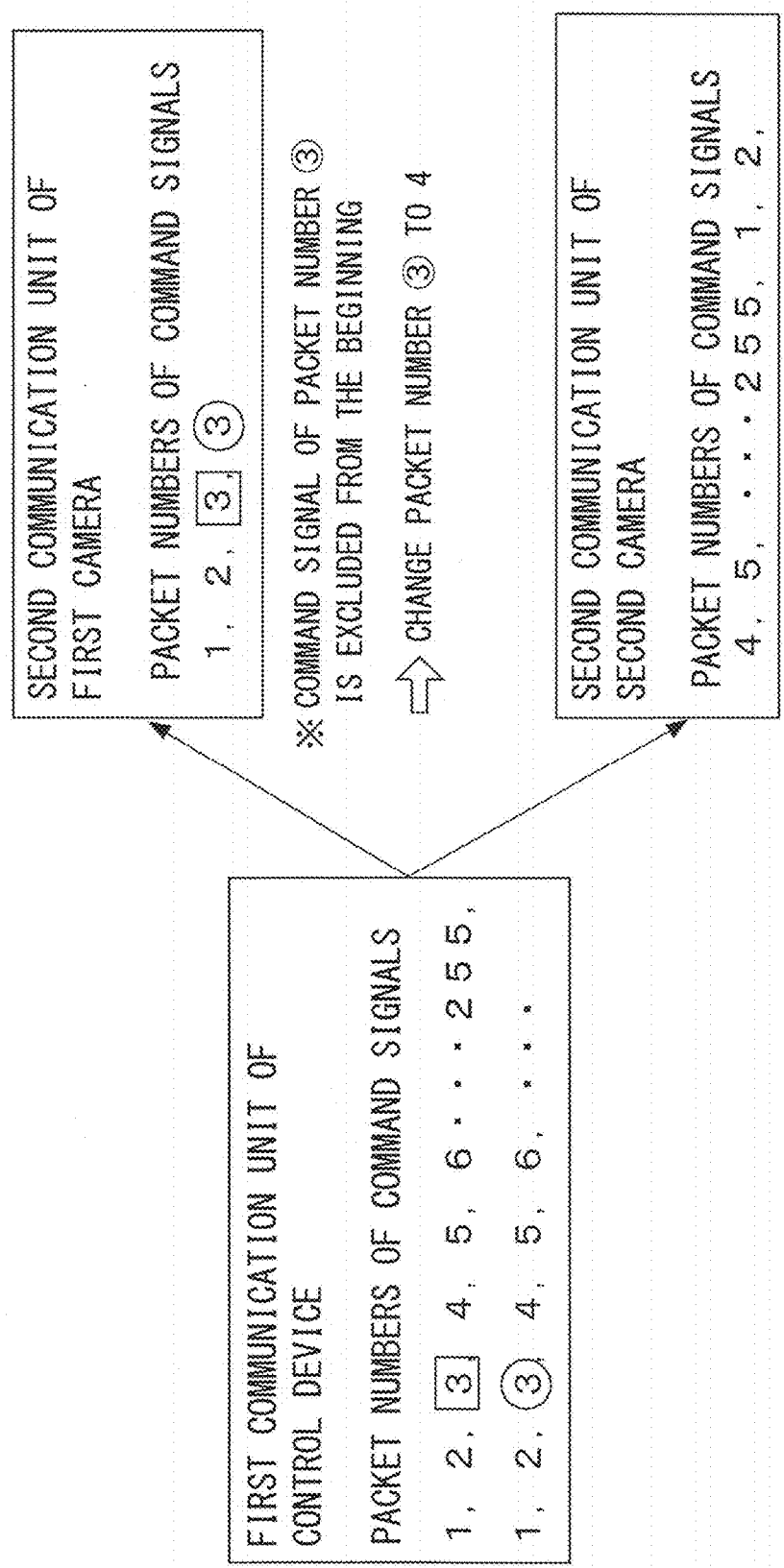
FIG. 11 is a diagram showing inconveniences that may occur due to a distributive transfer operation of command signals in an intermediate communication unit.

Here, an inconvenience that may occur due to the distributive transfer operation of the command signals in the intermediate communication unit 30 will be described with reference to FIG. 11.

Now, it is assumed that command signals including packet numbers 1, 2, and 3 are sequentially transmitted in order from the first communication unit 11 of the control device 10 to the second communication unit 23 of the first camera 21. Here, the packet number "3" of the command signal transmitted last is surrounded by a square in FIG. 11.

Thereafter, it is assumed that command signals including packet numbers 4, 5, 6, to 255 are sequentially transmitted in order from the first communication unit 11 of the control device 10 to the second communication unit 23 of the second camera 22, then the packet number is returned to 1 and used, and command signals including the packet numbers 1 and 2 are sequentially transmitted in order to the second communication unit 23 of the second camera 22.

Further, it is assumed that the command signal including the packet number 3 is transmitted from the first communication unit 11 of the control device 10 to the second communication unit 23 of the first camera 21. The packet number 3 of the command signal transmitted here is surrounded by a circle in FIG. 11.

When a plurality of different command signals are distributed and transferred to the respective second communication units 23 of the first camera 21 and the second camera 22 in order as described above, the second communication unit 23 of the first camera 21 is in a state where it has sequentially received the command signal including the preceding packet number 3 surrounded by a square, and the command signal including the subsequent packet number 3 surrounded by a circle.

When the second communication unit 23 pays attention to the packet numbers and continuously receives command signals including the same packet number, the second communication unit 23 aims at only the first-received command signal as a processing target, and excludes the other command signals from processing targets. Therefore, even when the command signal including the subsequent packet number 3 surrounded by a circle has a data content different from that of the command signal including the preceding packet number 3 surrounded by a square, the command signal is excluded from processing targets.

Therefore, in the communication system of the present embodiment, the intermediate communication unit 30 performs the change processing on the packet number of the command signal individually for each transfer destination so that data signals including the same packet number, but having different contents are not sequentially transmitted to each transfer destination.

Figure 12:
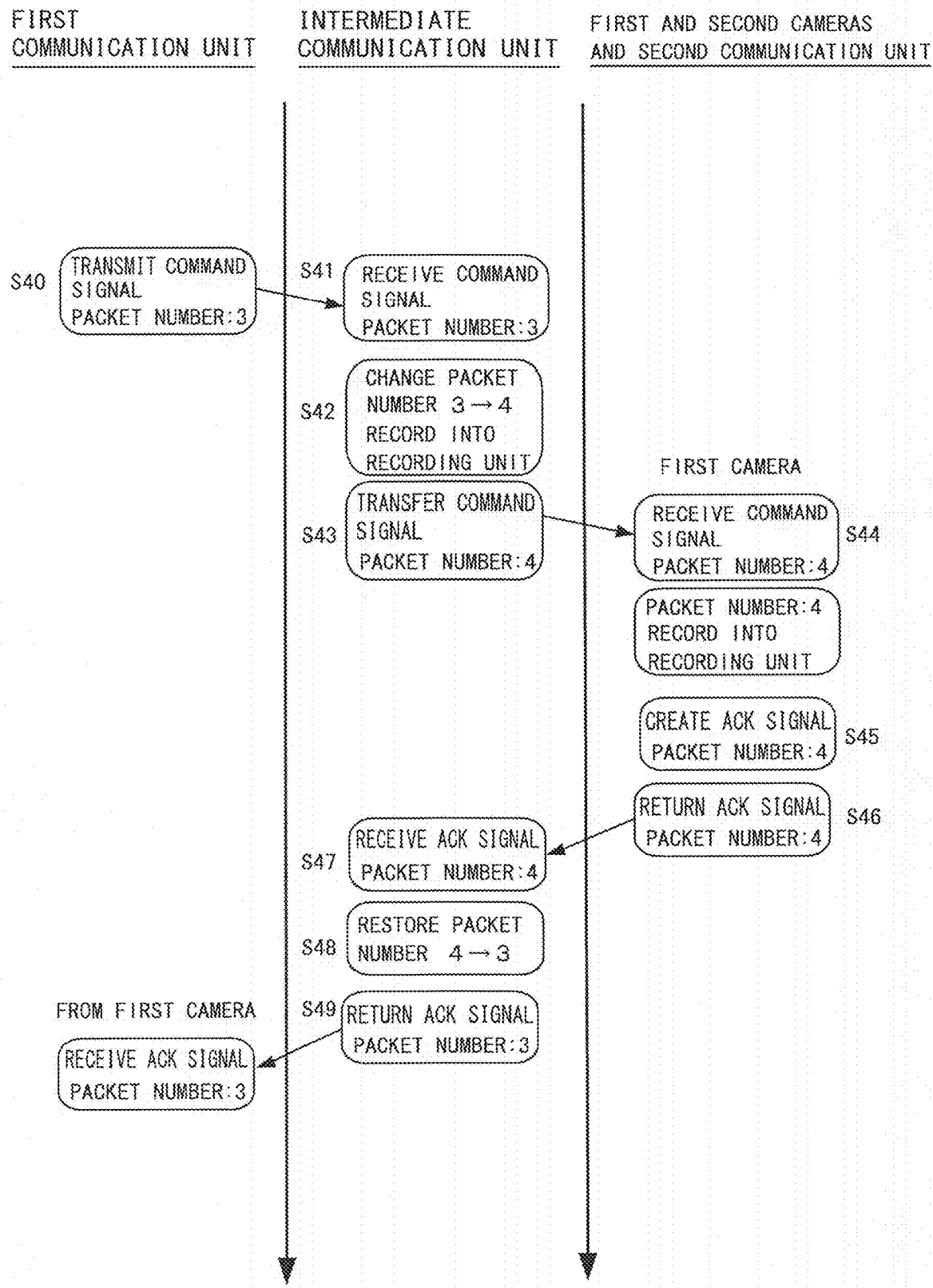
FIG. 12 is a sequence diagram showing a configuration for avoiding inconveniences that may occur due to the distributive transfer operation of command signals in the intermediate communication unit.

FIG. 12 shows a configuration for avoiding the above-mentioned inconvenience that may occur due to the distributive transfer operation of the command signals in the intermediate communication unit 30.

In other words, when a command signal including the packet number 3 (surrounded by a circle in FIG. 11) is transmitted from the first communication unit 11 of the control device 10 (step S40), the intermediate communication unit 30 receives this command signal (step S41), and the processing unit 37 changes the packet number from 3 to 4 and includes it into a command signal (step S42). The change from the packet number 3 to 4 is recorded in the recording unit 38.

The command signal including the packet number 4 is transferred from the intermediate communication unit 30 to the second communication unit 23 of the first camera 21 (step S43).

The second communication unit 23 of the first camera 21 receives this command signal (step S44), and creates an ACK signal for this command signal (step S45). The packet number 4 is caused to be included in the ACK signal. This ACK signal is returned to the intermediate communication unit 30 (step S46).

The intermediate communication unit 30 receives the ACK signal returned from the second communication unit 23 of the first camera 21 (step S47), and restores the packet number 4 included in the ACK signal to an original packet number 3 which is a packet number before the packet number has been changed (step S48), and returns the ACK signal to the first communication unit 11 of the control device 10 (step S49).

By changing the packet number in this way, it is possible to avoid the above-mentioned inconvenience that may occur due to the distributive transfer operation of the command signals in the intermediate communication unit 30.

Note that the present invention is not limited to the above-described embodiments.

Figure 13:
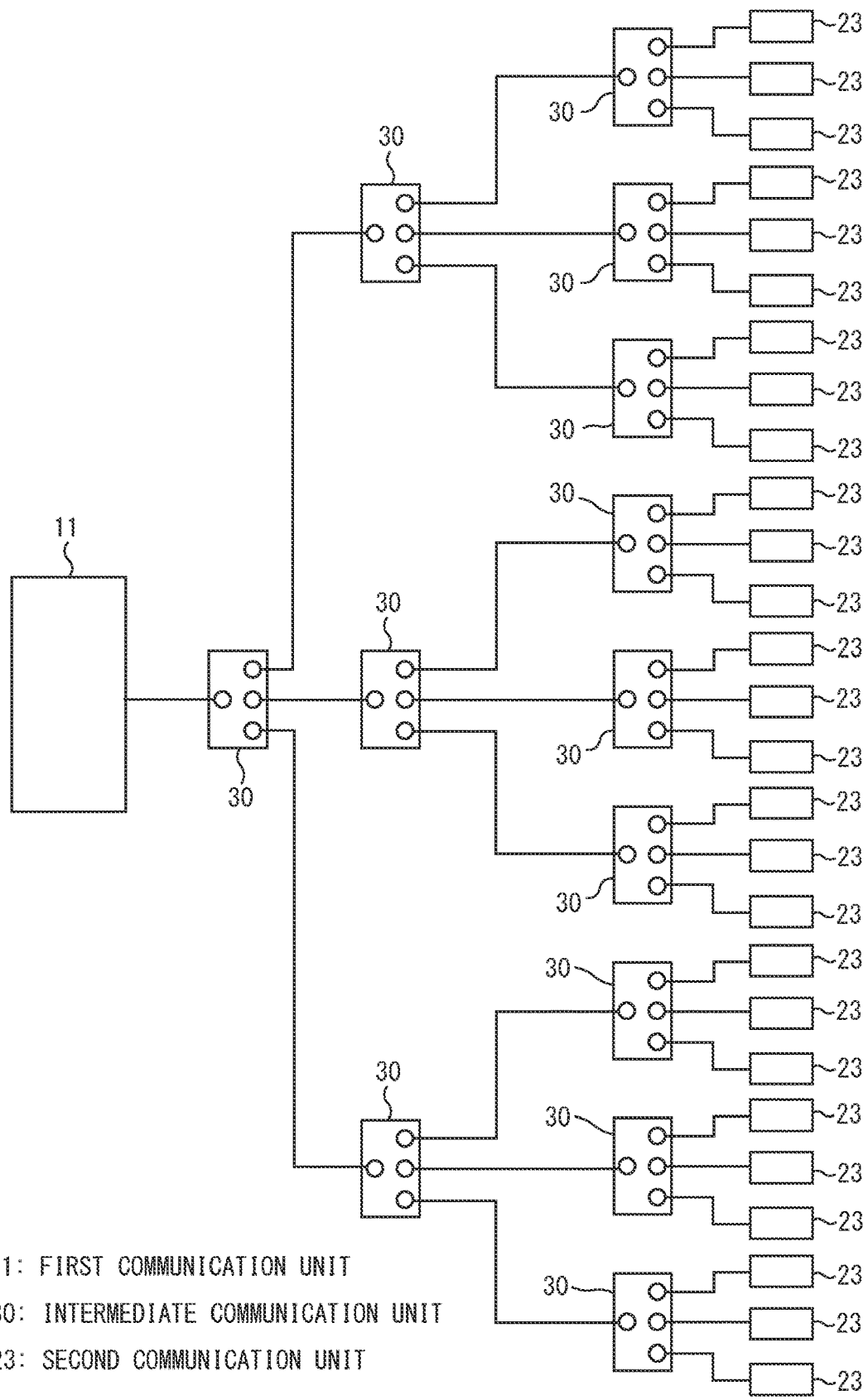
FIG. 13 is a communication system diagram showing an application example according to the second embodiment of the present invention.

For example, the communication system of the present invention that performs packet data communication between the first communication unit 11 and the plurality of second communication units 23 via the intermediate communication unit 30 can construct a communication network in which a large number of second communication units 23 are connected to the first communication unit 11 by passing signals through intermediate communication units 30 in multiple stages as shown in FIG. 13.

When signals are passed through intermediate communication units 30 in multiple stages as described above, an intermediate communication unit 30 may receive not only a command signal from the first communication unit 11, but also a command signal from another intermediate communication unit 30. The command signal received from another intermediate communication unit 30 as described above is also processed in the same manner as the command signal from the first communication unit 11.

Further, an intermediate communication unit 30 may receive not only an ACK signal from the second communication unit 23, but also an ACK signal returned from another intermediate communication unit 30. The thus-received ACK signal from another intermediate communication unit 30 is also processed in the same manner as the ACK signal from the second communication unit 23.

It goes without saying that various modifications and applications can be implemented without departing from the configuration concepts recited in the claims.

The invention claimed is:

1. A communication system for performing packet data communication between a first communication unit and a second communication unit, wherein the first communication unit is configured to transmit a data signal to the second communication unit with an identification code being included in the data signal, the second communication unit is configured to return an ACK signal including the same identification code as an identification code included in a received data signal to the first communication unit, the first communication unit repeatedly transmits the transmitted data signal to the second communication unit at a time interval shorter than a preset failure determination time, and the failure determination time is longer than a time in which the ACK signal is returned from the second communication unit without any failure.

2. The communication system according to claim 1, wherein with respect to the data signals having the same identification code repeatedly transmitted from the first communication unit, the second communication unit processes only a first-received data signal as a processing target, and excludes subsequently repeatedly transmitted data signals having the same content from processing targets.

3. The communication system according to claim 2, wherein the first communication unit transmits a data signal including an identification code having a preset predetermined value to the second communication unit at an arbitrary timing, and for a data signal including an identification code having the predetermined value, the second communication unit does not exclude the data signal from a processing target.

4. The communication system according to claim 1, wherein when the first communication unit receives an ACK signal including the same identification code as an identification code included in a transmitted data signal from the second communication unit, the first communication unit stops a repeated transmission operation of data signals including the identification code.

5. The communication system according to claim 4, wherein after receiving an ACK signal, the first communication unit includes a new identification code in a data signal to be next transmitted, and then transmits the data signal to the second communication unit.

6. The communication system according to claim 4, wherein when the preset failure determination time has elapsed without receiving any ACK signal including the same identification code as an identification code included in a transmitted data signal from the second communication unit, the first communication unit stops the repeated transmission operation of the transmitted data signal.

7. The communication system according to claim 1, wherein the first communication unit repeatedly transmits the transmitted data signal to the second communication unit at a preset frequency.

8. A camera control system to be incorporated with the communication system according to claim 1, comprising: a control device including the first communication unit; and a camera including the second communication unit, wherein the data signal transmitted from the first communication unit includes all or some of commands for controlling the camera in data.

9. A communication device to be incorporated in the communication system according to claim 1, comprising the first communication unit.

10. A communication device to be incorporated in the communication system according to claim 1, comprising the second communication unit.

11. A communication system for performing packet data communication between a first communication unit and a plurality of second communication units via an intermediate communication unit, wherein
the first communication unit includes an identification code in a data signal and then transmits the data signal to the intermediate communication unit,
the intermediate communication unit distributes and transfers the received data signal to the second communication unit or another intermediate communication unit,
the intermediate communication unit and the second communication unit are configured to return an ACK signal including the same identification code as the identification code included in the received data signal to a transmission source of the data signal,
the first communication unit repeatedly transmits the transmitted data signal at a time interval shorter than a preset failure determination time,
the intermediate communication unit likewise repeatedly transfers the transferred data signal at a time interval shorter than the preset failure determination time, and
the failure determination time is longer than a time in which the ACK signal is returned without any failure from each of the intermediate communication unit and the second communication unit.

12. The communication system according to claim 11, wherein with respect to data signals including the same identification code repeatedly transmitted from the first communication unit, the intermediate communication unit processes only a first-received data signal as a processing target, and excludes subsequently repeatedly transmitted data signals having the same content from processing targets, and with respect to data signals including the same identification code repeatedly transferred from the intermediate communication unit, the second communication unit processes only a first-received data signal as a processing target, and excludes subsequently repeatedly transferred data signals having the same content from processing targets.

13. The communication system according to claim 12, wherein the first communication unit transmits a data signal including an identification code having a preset predetermined value at an arbitrary timing, and with respect to data signals including the identification code having the predetermined value, the intermediate communication unit and the second communication unit do not exclude the data signals from processing targets.

14. The communication system according to claim 12, wherein when receiving an ACK signal including the same identification code as the identification code included in the transmitted data signal, the first communication unit is configured to stop a repeated transmission operation of data signals including the identification code, and when receiving an ACK signal including the same identification code as the identification code included in the transferred data signal, the intermediate communication unit is configured to stop a repeated transfer operation of data signals including the identification code.

15. The communication system according to claim 14, wherein the first communication unit is configured to include a new identification code in a data signal to be next transmitted and transmit the data signal to the intermediate communication unit after receiving the ACK signal.

16. The communication system according to claim 14, wherein when a preset failure determination time has elapsed without receiving any ACK signal including the same identification code as the identification code included in the transmitted data signal, the first communication unit is configured to stop a repeated transmission operation of the transmitted signal, and when a preset failure determination time has elapsed without receiving any ACK signal including the same identification code as the identification code included in the transferred data signal, the intermediate communication unit is configured to stop a repeated transfer operation of the transferred data signal.

17. The communication system according to claim 12, wherein the first communication unit is configured to repeatedly transmit the transmitted data signal at a preset frequency, and the intermediate communication unit is configured to repeatedly transfer the transferred data signal at a preset frequency.

18. The communication system according to claim 12, wherein the intermediate communication unit is configured to change an identification code of a data signal individually for a transfer destination of the data signal so that data signals including the same identification code, but having different contents are not sequentially transferred to the transfer destination.

19. The communication system according to claim 18, wherein the intermediate communication unit restores an identification code included in an ACK signal returned for a data signal transferred with an identification code thereof being changed, to an original identification code before the identification code has been changed, and then returns the ACK signal to a transmission source of the data signal.

20. A communication device to be incorporated in the communication system according to claim 11, comprising the intermediate communication unit.

* * * * *